(No Model.)
G. F. SMITH.
BUTTER PACKAGE.
No. 438,195. Patented Oct. 14, 1890.
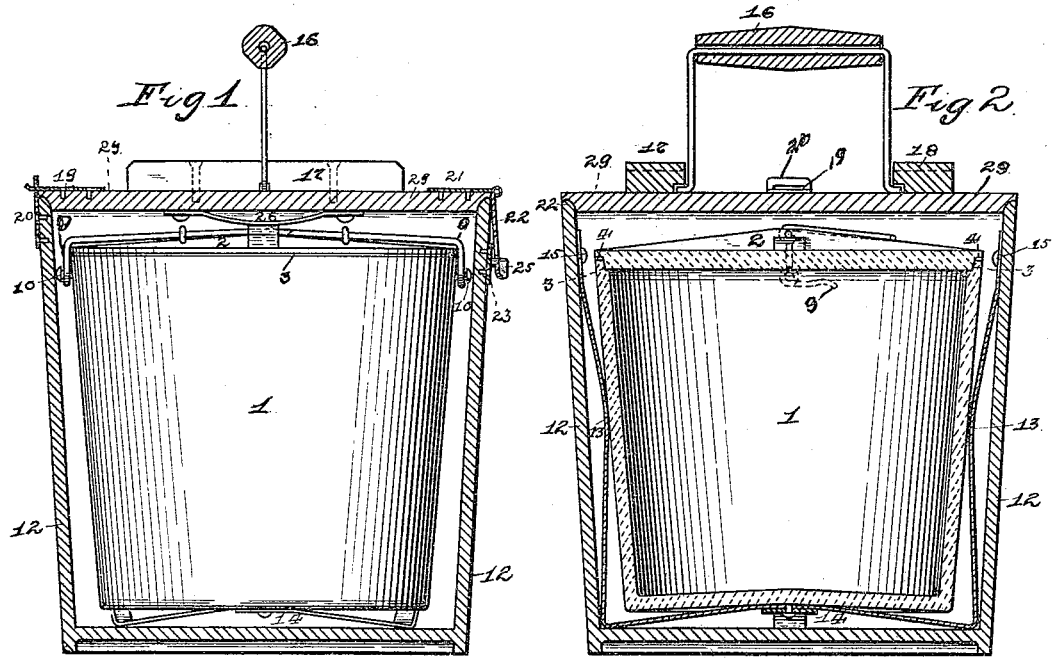
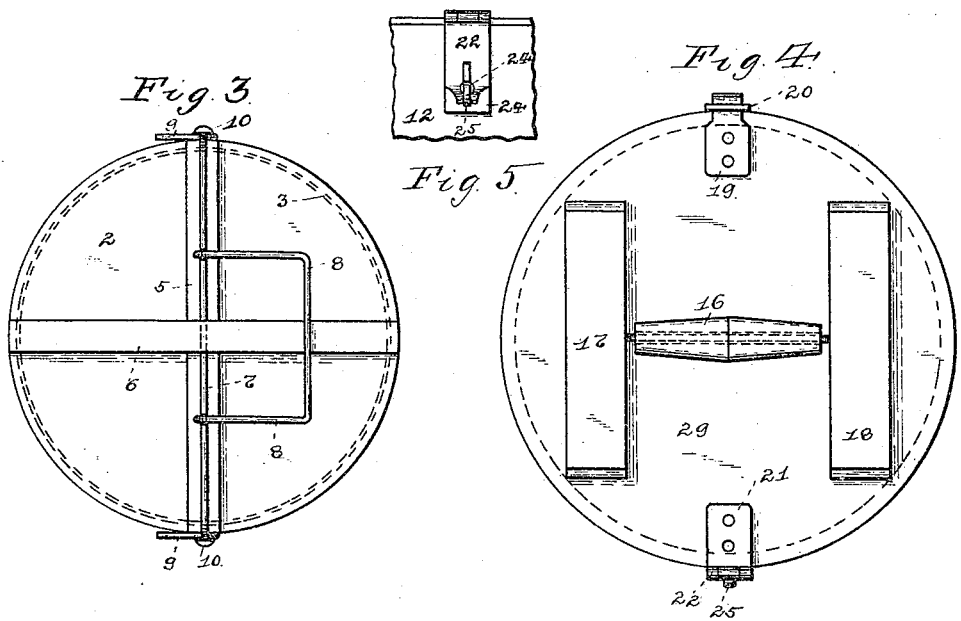
Witnesses:
J. N. Cook
Wm. L. Pierce.
Inventor:
George F. Smith
by his attorney
S. S. Robertson

United States Patent Office.

GEORGE F. SMITH, OF ELMIRA, NEW YORK, ASSIGNOR, BY DIRECT AND MESNE ASSIGNMENTS, OF TWO-THIRDS TO WILLIAM G. HUNTER, BRADNER L. HARRIS, JOHN KESSLER, SR., AND JOHN KESSLER, JR., ALL OF PITTSBURG, PENNSYLVANIA.

BUTTER-PACKAGE.

SPECIFICATION forming part of Letters Patent No. 438,195, dated October 14, 1890.

Application filed January 30, 1890. Serial No. 338,617. (No model.)

*To all whom it may concern:*

Be it known that I, GEORGE F. SMITH, a citizen of the United States, domiciled in the city of Elmira, in the county of Chemung and State of New York, now temporarily residing in the city of Pittsburg, in the county of Allegheny and State of Pennsylvania, have invented a new and useful Improvement in Butter-Packers, of which the following is a specification.

The purpose of my invention, generally stated, is to devise an air-tight package for storing butter or similar merchandise, and also to make an exterior package to receive the first package when the latter is made of glass or fragile material. The further details of my invention will appear below.

In the accompanying drawings, which make part of this specification, Figure 1 is a side elevation of both vessels. Fig. 2 is a central vertical section of both vessels. Fig. 3 is a top view of the cover of the inside package. Fig. 4 is a like view of the cover of the outside package with its handle raised, and Fig. 5 is a detail front view of the hinge-fastening of the outside cover.

In the practice of my invention I take a vessel 1, preferably of glass, of any convenient size and shape, having a slightly-beveled offset top on the inside.

2 is the cover for the vessel 1. The cover 2 has a flange or collar 3, which sets into the vessel 1. Between the cover 2 and the vessel 1 is a gasket 4, preferably of paper soaked in paraffine, to exclude the air. The cover 2 is also desirably made of glass with two cross-ribs 5 and 6, as seen in Fig. 3, and has a tapering flange. The rib 6 is perforated or notched to permit of the passage of the spring-rod 7, at each end of which is the hook 9, which locks around the lug 10, blown in the side of the vessel 1.

8 is the bail or handle.

To protect the glass from breaking during transportation, &c., I prefer to inclose it in an outer vessel 12, of wood or suitable material. The package 1 does not rest directly upon the bottom or against the sides of this outer vessel 12, but upon two pairs of springs 13 13, fastened at the top of the vessel 12 and a common center 14 at the bottom. The central portions of the springs running from the top to the bottom of the vessel 12 are bowed out against the vessel 1. The springs 13 13 have slots, by which they move up and down on pins 15 to give ease when combined packages are subjected to jolting motion. A like spring 26 is interposed between the two covers, being fastened to the inside of the upper cover.

The outer cover 29 has a bail 16, fastened to two cleats 17 and 18, screwed to said cover 29. One side of the cover 29 is fastened by the hook 19 on the cover and the eye 20 fastened on the vessel 12. The other side of the cover has a hasp-hinge, one part of which 21 is screwed to the cover and the other half 22 slotted hangs down over the side of the vessel 12. In the side of the vessel 12 is fastened a plate 23, in which turns a screw-bolt 24, with head 25, which locks the hasp-hinge in place.

If desired, the springs 13 13 may be omitted and the space between the inner and outer package be filled with sawdust or other fit material, which also may be done when the springs are retained.

It will readily be seen that my packer has the advantages of being air-tight while exposing its contents to view, assuming that the inside vessel is made of glass; also, that there is no danger of breakage, as the glass or other fragile material is surrounded by a spring-lined outer package which will break the force of all rough shocks to which the vessel would be exposed. The covers, while securely sealing the two vessels, are quickly removed, and the entire apparatus is neat in appearance and inexpensive in manufacture.

Having fully described my invention, I claim—

1. A butter-package consisting of a body, a lid suitably secured on the body, an outer casing, the vertical springs 13, secured to the outer casing and intermediate of said casing and the body, said springs being slotted near one end, a spring 14 interposed between the bottom of the body 1 and the floor of the outer casing, and a cover 29, having the hasp 19, the hinge 21, and the bail 16, pivoted to the transverse ribs 17 18, as and for the purpose described.

2. A butter-package consisting of a body 1, the lid 2, having the raised ribs 5 6 on its outer face, the projections 10 on the sides of body 1, the rod 7, passing through one of the transverse ribs and attached by hooks to the projections 10, and a bail secured to said rod at points on opposite sides of one of the ribs, as and for the purpose described.

In testimony whereof I have hereunto set my hand.

GEORGE F. SMITH.

Witnesses:
JOHN REHMAN,
S. S. ROBERTSON.